Oct. 7, 1969

O. V. INGRUBER 3,471,393

APPARATUS FOR TESTING LIQUIDS UTILIZING PLURALITY
OF PROBES OR ELECTRODES WITH SENSITIVE ENDS
CONVERGING IN LIQUID FLOW PATH

Filed April 4, 1966

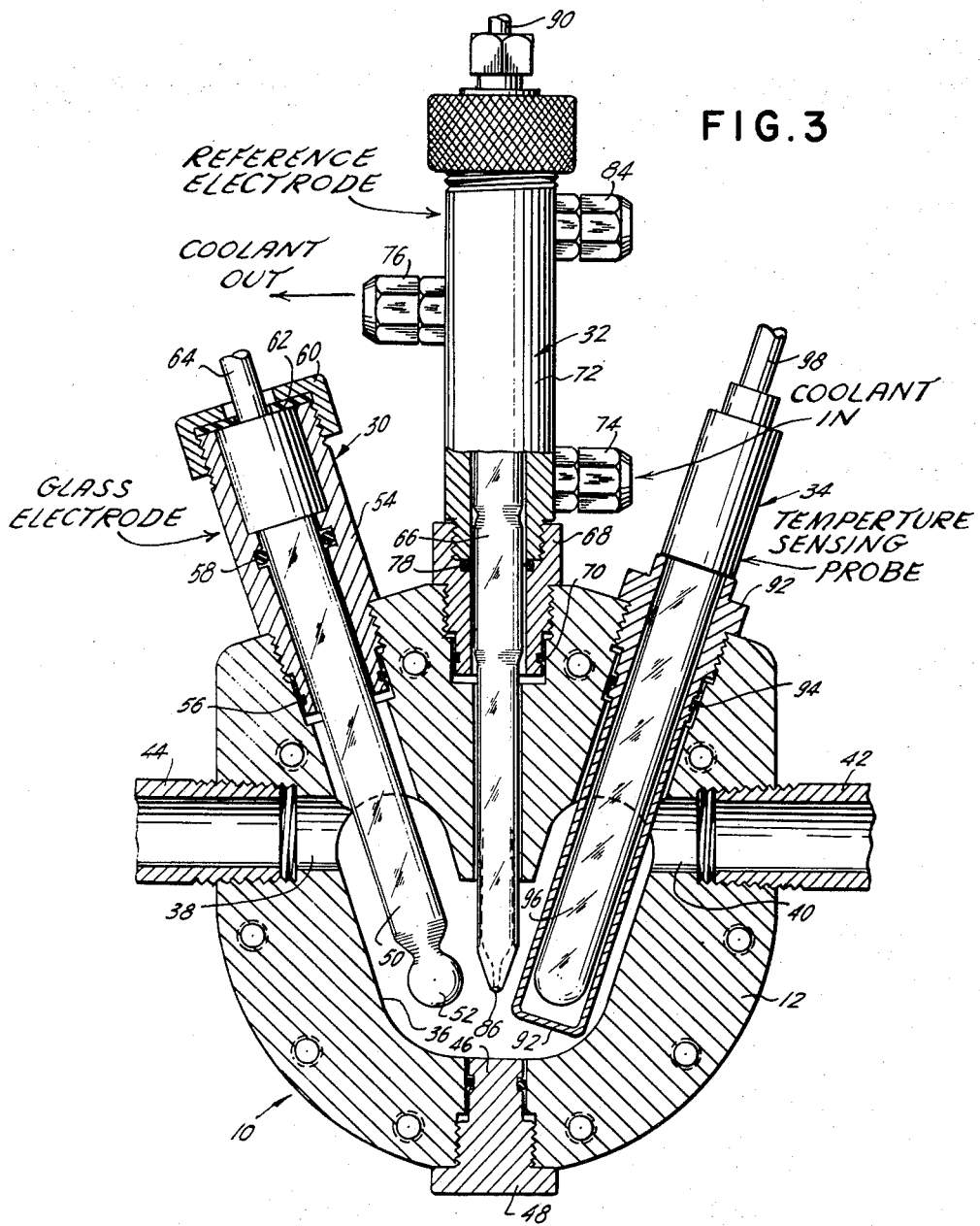

United States Patent Office 3,471,393
Patented Oct. 7, 1969

3,471,393
APPARATUS FOR TESTING LIQUIDS UTILIZING PLURALITY OF PROBES OR ELECTRODES WITH SENSITIVE ENDS CONVERGING IN LIQUID FLOW PATH
Otto V. Ingruber, Vankleek Hill, Ontario, Canada, assignor to Canadian International Paper Company, Montreal, Quebec, Canada, a corporation of Quebec
Filed Apr. 4, 1966, Ser. No. 539,908
Int. Cl. B01k 3/00; G01n 27/26; G01r
U.S. Cl. 204—195         8 Claims

ABSTRACT OF THE DISCLOSURE

Liquid flow cell, insertible into a line containing a flowing stream of liquid, for mounting a plurality of probes or sensing devices for testing physical characteristics of that liquid. Cell includes a U-shaped recess through which the liquid flows first downwardly and then upwardly to give good mixing and continued immersion of test devices in liquid in event of interruption of flow. Cell includes means for mounting probes or sensing devices in converging relationship with sensitive ends closely clustered in lower portion of U-shaped recess.

---

The present invention relates to a flow cell assembly suitable for insertion in a pipe line or in a bypass pipe line for measurement of and, with suitable auxiliary equipment, the control of selected physical chemical properties or values of a liquid flowing through the pipe line. For example the flow cell of the present invention may be equipped to make pH, redox or other measurements with the sensitive parts of the probes which are required so closely spaced and located in a cell of such contour and small volume that at any given instant all of the probes are reacting to the same very small, well mixed sample, even at very low rates of flow of the liquid under test.

More particularly the present invention affords a flow cell having the advantages just discussed and which is operative in connection with process liquids under pressures and at temperatures substantially above those at which prior art devices are operative. A typical embodiment of the present invention provides for pH measurement and thus will include three electrodes or probes, namely, a reference electrode, a glass electrode and a temperature measuring device. These electrodes or probes are arranged in converging fashion with the sensitive ends thereof closely grouped in the lower portion of a U-shaped flow chamber formed in a rugged metal body in which the probes are sealed in pressure-tight manner. This is in contrast with the prior art practices in which the electrodes or probes are usually inserted into cylindrical flow tubes or into upright cylindrical test cells or into a processing vessel, and in nearly all instances the electrodes or probes are either too far apart to be simultaneously testing a sample of sufficiently small volume or, particularly at low flow rates, are simultaneously testing an insufficiently mixed sample.

The present invention affords other advantages including a high degree of protection of the measuring devices from accidental damage and the provision of an inspection port through which the electrodes or probes may be visually observed to detect damage or impending failure and which also may be utilized, when a vane or spinner is included in the cell, to observe flow or rate of flow as may be desired.

It is the primary object of the invention to provide a flow cell of the character described. Other and further objects will become apparent from a consideration of the following detailed description of a preferred, but not necessarily the only, form of the invention taken in connection with the drawings forming a part of this specification.

Figure 1:
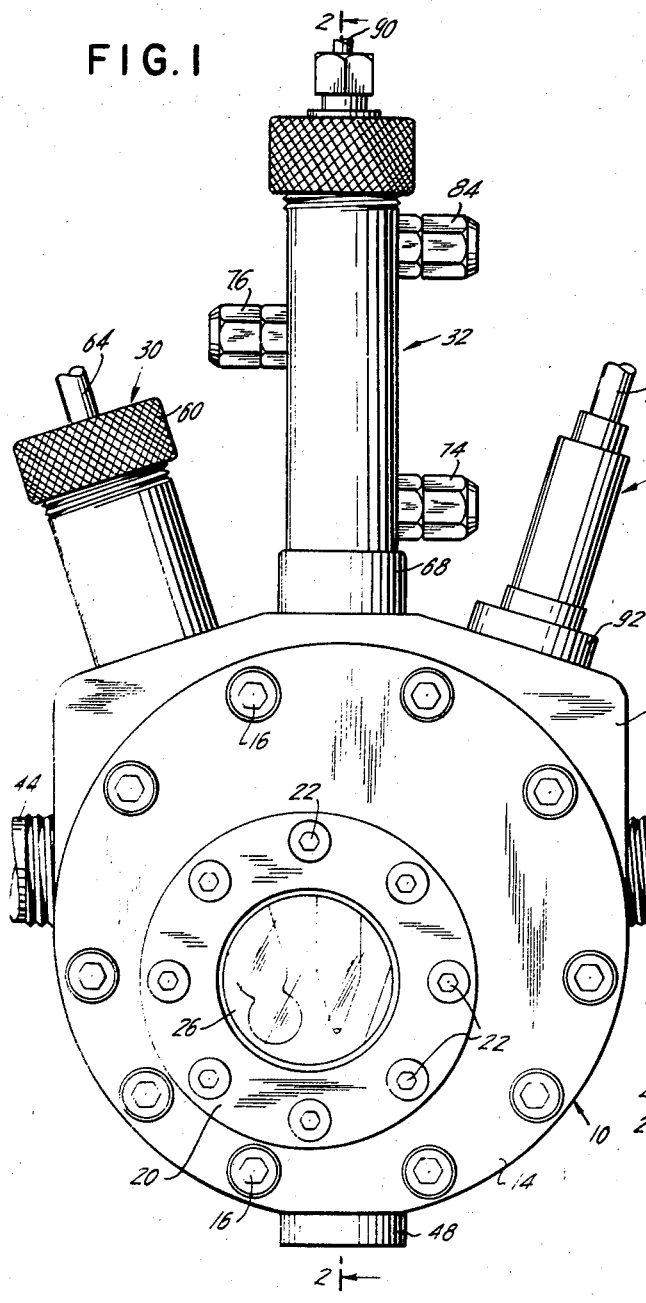
Figure 2:
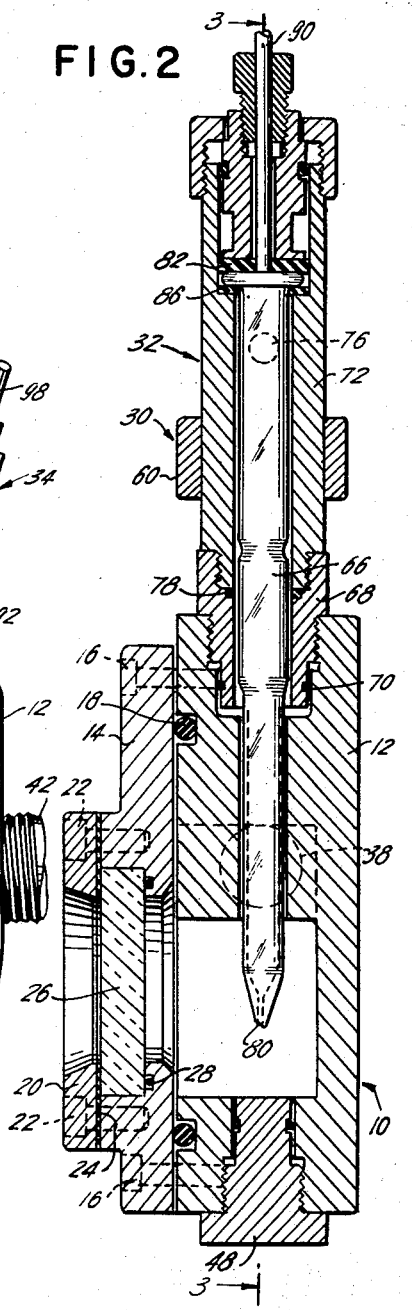

In the drawings:
FIG. 1 is an elevational view of a flow cell embodying the present invention;
FIG. 2 is a vertical sectional view taken along the line 2—2 in FIG. 1; and
FIG. 3 is a vertical sectional view taken along the line 3—3 in FIG. 2.

Referring now to the drawings there is shown a flow cell 10 comprising a body 12, a cover plate 14, held in place and sealed by suitable means such as screws 16 and an O-ring 18 (see FIG. 2), and an inspection port assembly including a ring-shaped plate 20 secured and sealed by suitable means such as screws 22 and gasket 24 to the cover plate 14. The plate 20 is arranged to hold a port window 26, made of suitable transparent material, in sealed position by means of the gasket 24 and an O-ring 28.

As shown in the drawings the flow cell 10 illustratively is provided with three electrodes or probes 30, 32 and 34 the sensitive ends of which enter through the body 12 and converge in a U-shaped recess 36 (see FIG. 3) formed in the body 12. The recess 36 communicates, through ports 38 and 40 with pipes 42 and 44 to establish a flow path through the body 12 for the liquid to be tested. The flow path includes the generally horizontally disposed ports 38 and 40 and the U-shaped recess 36 whereby the liquid flowing through the cell 10 makes several changes in direction in a generally tight conformation and thus is subjected to an effective mixing operation just at the time it is tested by or reacted with the probes or electrodes 30, 32 and 34. This is particularly important at low rates of flow where settling or layering of components of the liquid stream might otherwise occur.

It should be emphasized that the U-shaped recess 36 preferably is held to substantially minimum dimensions to accommodate the converging, closely spaced sensitive ends of the electrodes or probes 30, 32 and 34 and to accommodate the desider volumetric flow of the liquid to be tested. Also, the ends of the electrodes or probes are positioned in the lower portion of the U-shaped recess 36, below the level of the ports 38 and 40 whereby when the process operation is discontinued the ends remain immersed in process liquid, particularly desirable with certain types of electrodes or probes.

An opening 46 at the bottom of the U-shaped recess 36 may be normally closed by a threaded plug 48 and utilized for cleaning or draining of the flow cell 10 when desired. Optionally or additionally the opening 46 may be utilized for the positioning of some additional useful device, such as a vane or spinner (not shown) which may be so positioned as to be visible through the port glass 26, or a lighting device or a further electrode or probe.

In the embodiment shown in the drawings the electrodes or probes 30, 32 and 34 illustratively are a glass electrode 30, a pH reference electrode 32 and a temperature-compensating probe 34. Each of these units is threadably received and sealed in high-pressure-resistant manner in converging openings formed in the body 12. Each unit is provided with appropriate O-rings, gaskets and the like as shown illustratively in the drawings. Thus, the glass electrode 30 comprises a glass sensing portion 50 which terminates in a bulb 52 located opposite the viewing port 26. The glass portion 50 is inclined so as to extend toward the central zone of the U-shaped recess 36. The glass portion 50 is sealed in a threaded casing 54 by O-ring 58 and the casing 54 is sealed by O-ring 56, cap 60, and gasket 62. A connector 64 extends through the cap 60 to afford connection with a suitable instrument or control device (not shown).

The pH reference electrode 32 may be of the type shown in U.S. Patent No. 2,846,386 granted Aug. 5, 1958 and is especially constructed to operate at the high temperatures and/or pressures for which the flow cell of present invention is adapted. Thus, the glass body 66 (see FIG. 2) is located within a bushing 68 threaded into the flow-cell body 12 sealed by an O-ring 70. A casing 72 of suitable metal such as stainless steel surrounds the upper portion of the glass body 66 and forms a chamber for coolant fluid which is supplied through pipe or tube fittings 74 and 76 (see FIG. 1). The coolant chamber is isolated and sealed by an O-ring 78 and gaskets 80 and 82. A pressure compensating connection 84 enters the reference electrode 32 from the side and is connected to a source (not shown) of gas, such as nitrogen, suitably pressurized to maintain within the glass body 66 a pressure slightly above that of the liquid under test which is flowing through the U-shaped recess 36. At its lower end the glass portion 66 is provided with a capillary opening 86 which provides a liquid junction between the liquid under test and the electrolyte within the glass portion 66 of the reference electrode 32. The electrical connection between the interior of the electrode 32 and the instrument or control device (not shown) is made through a cable 90 (see FIG. 2). It will be noted that the lower end of the glass body 66 of the reference electrode 32 is projected to a point in the central region of the U-shaped recess 36 which is very close to the bulb 52 of the glass electrode 30.

The temperature compensating probe 34 comprises a casing 92 of suitable metal, such as stainless steel which is threadably received in an inclined opening in the body 12 and is sealed by an O-ring 94. The sensing element 96 is positioned within the casing 92 and is provided with a connector 98 which, in turn, is connected with the instrument or control device (not shown). The sensing element 96 terminates at a point within the central portion of U-shaped recess 36 very close to the sensitive ends of the electrodes 30 and 32.

As an illustration of the compactness of the assembly and of the very small size of the sample of liquid to be tested at any given moment typical dimensions of a flow cell 10 will be given. Thus when the inlet and outlet pipes 42 and 44 and ½" standard pipes the net volume of the U-shaped recess 36 with the electrodes or probes inserted is about 80 ml. when the particular configuration shown in the drawings is employed. Even this small volume may be further reduced by reducing the horizontal dimension of the recess 36 as viewed in FIG. 2. Such further reduction would be most appropriate and most needed with very low liquid flow rates. With the configuration shown, for ½" pipes, the body 12 may have a maximum outside dimension of about 5" and the external ends of the probes or electrodes 30, 32 and 34 are clustered in a zone about 5" x 5" x 1½" and they all extend upwardly generally in alignment with the pipes 42 and 44 where they are less exposed to accidental damage than they would be if they or some of them were to jut out transversely of the pipe lines. Also, the compact cluster of external ends may be enclosed in a small rugged shield (not shown) when desired. The compactness, small size of interior chamber and safety features all hold, of course, in a proportionate manner for units designed for pipes of larger size.

The materials for construction of the flow cell of the present invention should be chosen with a view toward the particular liquid to be tested and the temperature and pressure involved. Generally, stainless steel of suitable composition may be used for all of the metal parts such as the body 12, cover 14, port ring 20 and the assembly screws. The viewing port 26 may usually be of glass of heat resistant type and of a thickness appropriate for the liquid pressure involved. For example the flow cell 10 may be made of stainless steel and the port window of Pyrex glass ⅜" thick for continuous testing and/or control of cooking liquor for production of pulp from wood at pressures as high as 200 p.s.i.g. and temperatures as high as 200° C. It will be apparent that the materials and/or construction of elements may be chosen for operation at higher pressures and/or temperatures when so desired.

For use with strongly alkaline liquids the port window 26 may be made of alkaline resistant transparent material such as a plastic of suitable composition and thickness.

From an observation of FIGS. 2 and 3 it will be noted that when the probes or electrodes 30 and 34 are positioned within the downwardly and upwardly extending portions of the U-shape recess 36 the bodies 50 and 92 thereof will occupy a considerable portion of the cross-sectional dimensions of said portions. For normal commercial operations the net cross-sectional area left for flow of test liquid through the recess 36 should be at least about equal to and should not greatly exceed the cross-sectional area of the entrance and exit passageways 38 and 40 whereby no drastic change in velocity of the liquid under test will occur as the liquid flows through the cell 10. Drastic reduction in velocity, which would occur if the net cross section were to be substantially greater would in effect, proportionately enlarge the test sample and could cause some of the benefits of good mixing to be lost. On the other hand the net cross section of the portion of the passageway within recess 36 should not be so much smaller than the entrance and exit passageways 38 and 40 as to cause drastic increase in velocity of liquid flow, with attendant increase in likelihood of damage to the sensing devices.

From the above detailed description of a preferred form of the present invention it will be apparent that there is provided a flow cell which has a U-shaped flow channel of relatively very small size and within which the sensing ends of probes or electrodes are very closely clustered for sensing at any given moment a very small sample of the liquid under test. In this manner the operation sensed or controlled by the elements will respond very quickly to changes in the liquid under test and lag is reduced to a practical minimum. In the illustrated embodiment the measuring, reference and temperature compensating values are reported from a sample of unusually small size and control of the process may be held to very small tolerances. The U-shaped flow channel, as noted above, not only affords maximum mixing of the sample when the process is in operation but also maintains the sensing elements immersed in the process liquid during periods when operation of the process is suspended.

What is claimed is:

1. A flow cell for the testing of physical chemical values of a flowing stream of liquid at elevated temperatures and pressures, comprising a body of chemically resistant material having formed therein a passageway constituting a liquid flow path for a flowing stream of liquid to be tested, said liquid flow path including first and second generally horizontally disposed ports, and a U-shaped recess, said U-shaped recess having a downwardly extending portion communicating with one of said first and second ports, and an upwardly extending portion communicating with the other of said first and second ports, and said U-shaped recess having a lower central portion below the level of said first and second ports, said liquid flow path thus providing several changes in direction of flow of said stream of liquid through said flow cell; and means for mounting on said flow cell first and second sensing devices comprising bodies having sensitive ends, said means for mounting said first and second sensing devices including respectively first and second openings extending downwardly in converging relationship through the body of said flow cell and into said U-shaped recess and also including means for securing said first and second sensing devices respectively in said first and second openings with the bodies of said first and second sensin gdevices extending downwardly respectively through said first and second openings into said U-shaped recess, said bodies of said first and second sensing devices converging toward one another within said U-shaped recess with the sensitive ends thereof positioned in closely spaced relationship in said lower central portion of said U-shaped recess.

2. A flow cell in accordance with claim 1 wherein first and second sensing devices as described in said claim 1 are mounted on said flow cell with the body of one of said first and second sensing devices extending downwardly through said downwardly extending portion of said U-shaped recess and with the body of the other of said first and second sensing devices extending downwardly through said upwardly extending portion of said U-shaped recess, and wherein the cross-sectional dimensions of said downwardly extending portion and said upwardly extending portion of said U-shaped recess are predetermined and so related to the cross-sectional dimensions of said bodies of said first and second sensing devices and the cross-sectional dimensions of each of said first and second ports as to afford a net cross-section for flow of said liquid through said U-shaped recess which is at least about equal to and not greatly in excess of that afforded by each of said ports.

3. A flow cell in accordance with claim 1 wherein said body of said flow cell is provided with means for mounting on said flow cell a third sensing device having a body and a sensitive end with the body thereof extending downwardly into the lower central portion of said U-shaped recess and with the sensitive end of said third sensing device positioned in closely spaced relationship with the sensitive ends of said first and second sensing devices.

4. A flow cell in accordance with claim 1 wherein said body of said cell is provided with an opening communicating with the lower central portion of said U-shaped recess, and a closure for said opening including a transparent window through which the interior of said lower central portions may be viewed from the exterior of said cell.

5. A flow cell in accordance with claim 2 wherein said body of said cell is provided with an opening communicating with the lower central portion of said U-shaped recess in which said sensitive ends of said first and second sensing devices are positioned, and a closure for said opening including a transparent window through which said sensitive ends of said first and second sensing devices may be viewed from the exterior of said cell.

6. A flow cell in accordance with claim 3 wherein said body of said cell is provided with an opening communicating with the lower central portion of said U-shaped recess, and a closure for said opening including a transparent window through which the interior of said lower central portion may be viewed from the exterior of said cell.

7. A flow cell in accordance with claim 3 wherein first, second and third sensing devices as described in said claim 3 are mounted on said flow cell with the body of one of said first and second sensing devices extending downwardly through said downwardly extending portion of said U-shaped recess, with the body of the other of said first and second sensing devices extending downwardly through said upwardly extending portion of said U-shaped recess, and with the body of said third sensing device extending into said lower central portion of said U-shaped recess; and wherein the cross-sectional dimensions of said downwardly extending portion, said upwardly extending portion and said lower central portion of said U-shaped recess are predetermined and so related to the cross-sectional dimensions of said bodies of said first, second and third sensing devices and the cross-sectional dimensions of said first and second ports as to afford a net cross-section for flow of said liquid through said U-shaped recess which is at least about equal to and not greatly in excess of that afforded by each of said ports.

8. A flow cell in accordance with claim 7 wherein one of said first, second and third sensing devices is a glass electrode, another is a pH reference electrode and another is a temperature sensing device and wherein said pH reference electrode is pressure compensated and liquid cooled whereby to operate in a stream of liquid to be tested flowing under a pressure of about 200 p.s.i.g. and at a temperature of about 200° C.

References Cited

UNITED STATES PATENTS

| | | | |
|---|---|---|---|
| 1,089,030 | 3/1914 | Angell | 324—30 |
| 1,320,036 | 10/1919 | Crockatt | 324—30 |
| 2,146,312 | 2/1939 | Powell et al. | 324—30 |
| 2,687,185 | 8/1954 | McChesney | 324—30 X |
| 2,709,781 | 5/1955 | Douty et al. | 324—30 |
| 2,846,386 | 8/1958 | Ingruber | 204—195 |
| 2,925,370 | 2/1960 | Rohrer | 204—195 |
| 2,985,305 | 5/1961 | Nick et al. | |
| 3,290,584 | 12/1966 | Harms et al. | 324—30 |

RUDOLPH V. ROLINEC, Primary Examiner

C. F. ROBERTS, Assistant Examiner

U.S. Cl. X.R.

324—30